US012644813B2

(12) United States Patent
Han et al.

(10) Patent No.: US 12,644,813 B2
(45) Date of Patent: Jun. 2, 2026

(54) METHOD, APPARATUS, AND DEVICE FOR EVALUATING DYNAMIC DIFFUSION OF NATURAL HYDROGEN IN ROCK PORES

(71) Applicants: CHINA UNIVERSITY OF MINING AND TECHNOLOGY (BEIJING), Beijing (CN); CHINA UNIVERSITY OF GEOSCIENCES (BEIJING), Beijing (CN)

(72) Inventors: Shuangbiao Han, Beijing (CN); Jin Wang, Beijing (CN); Chengshan Wang, Beijing (CN); Yu Qiao, Beijing (CN); Jie Huang, Beijing (CN)

(73) Assignees: China University of Mining and Technology (Beijing), Beijing (CN); China University of Geosciences (Beijing), Beijing (CN)

( * ) Notice: Subject to any disclaimer, the term of this patent is extended or adjusted under 35 U.S.C. 154(b) by 0 days.

(21) Appl. No.: 19/026,043

(22) Filed: Jan. 16, 2025

(65) Prior Publication Data

US 2025/0383278 A1      Dec. 18, 2025

Related U.S. Application Data

(63) Continuation of application No. PCT/CN2024/109100, filed on Aug. 1, 2024.

(30) Foreign Application Priority Data

Jun. 18, 2024      (CN) .......................... 202410786591.3

(51) Int. Cl.
*G01N 13/00*      (2006.01)
*G01N 15/00*      (2024.01)

(52) U.S. Cl.
CPC ............. *G01N 13/00* (2013.01); *G01N 15/00* (2013.01); *G01N 2013/003* (2013.01); *G01N 2015/0015* (2013.01)

(58) Field of Classification Search
CPC .. G01N 13/00; G01N 15/00; G01N 2013/003; G01N 2015/0015
See application file for complete search history.

(56) References Cited

U.S. PATENT DOCUMENTS 12,180,815 B1 *  12/2024  Luo ........................ E21B 49/087
2020/0240973 A1    7/2020  Xu et al.
(Continued)

FOREIGN PATENT DOCUMENTS

CN      109696540 A      4/2019
CN      110927359 A      3/2020
(Continued)

OTHER PUBLICATIONS

Han, Shuangbiao, et al., "Hydrogen Adsorption Characteristics of Coal Rock and Its Geological Significance", Journal of China Coal Society, vol. 49, No. 3, Mar. 2024.
(Continued)

*Primary Examiner* — Lina Cordero
*Assistant Examiner* — Lynda Dinh
(74) *Attorney, Agent, or Firm* — AP3 Law Firm PLLC

(57)      ABSTRACT

The application provides a method, an apparatus and a device for evaluating a dynamic diffusion of natural hydrogen in rock pores. The method includes: performing, at a target pressure and a target temperature, a simulation calculation of a natural hydrogen adsorption based on a pre-constructed pore model of a rock to be evaluated, and determining an average number of hydrogen molecules adsorbed in the rock pores when the natural hydrogen is saturated at the target pressure and the target temperature;
(Continued)

performing, at a target pressure and a target temperature, a simulation calculation of a natural hydrogen adsorption based on a pre-constructed pore model of a rock to be evaluated, and determining an average number of hydrogen molecules adsorbed in rock pores when the natural hydrogen is saturated at the target pressure and the target temperature — S110 determining a natural hydrogen content in the rock pores, based on lithologic parameters of the rock to be evaluated, the average number of hydrogen molecules adsorbed in the rock pores when the natural hydrogen is saturated at the target pressure and the target temperature, the target pressure and the target temperature — S120 adding one or more preset gases to the pre-constructed pore model, and when the pre-constructed pore model saturates at the target pressure and the target temperature, determining a loss content of the natural hydrogen, and determining a diffusion coefficient of the natural hydrogen — S130 determining a diffusion evaluation parameter, based on the natural hydrogen content in the rock pores, the loss content of the natural hydrogen and the diffusion coefficient of the natural hydrogen — S140 determining a natural hydrogen content, based on lithologic parameters, the average number of hydrogen molecules, the target pressure and the target temperature; adding one or more preset gases to the pre-constructed pore model, determining a loss content of the natural hydrogen, and determining a diffusion coefficient of the natural hydrogen; determining a diffusion evaluation parameter, based on the natural hydrogen content, the loss content and the diffusion coefficient.

11 Claims, 5 Drawing Sheets

(56) References Cited

U.S. PATENT DOCUMENTS

| | | | | |
|---|---|---|---|---|
| 2023/0393114 A1* | 12/2023 | Darrah | ................. | G01N 33/241 |
| 2024/0018869 A1* | 1/2024 | Harrington | ......... | E21B 49/0875 |
| 2024/0104924 A1 | 3/2024 | Darrah et al. | | |
| 2024/0427052 A1* | 12/2024 | Albertz | .................... | G01V 3/38 |
| 2025/0005233 A1* | 1/2025 | Moortgat | ................ | G06F 30/25 |

FOREIGN PATENT DOCUMENTS

| | | |
|---|---|---|
| CN | 116593376 A | 8/2023 |
| CN | 117451582 A | 1/2024 |
| WO | 2024108688 A1 | 5/2024 |

OTHER PUBLICATIONS

International Search Report and Written Opinion received in Patent Cooperation Treaty Application No. PCT/CN2024/109100, dated Dec. 23, 2024.

Jing, Xing-Peng, et al., "Test Technology on Gas Content of Tight Sandstone Gas", Journal of Xi'an University of Science and Technology, vol. 33, No. 5, Sep. 2013.

Li, Zhen, et al., "Characterization of an Angstrom-Scale Pore Structure in Organic-Rich Shales by Using Low-Pressure $CO_2$ Adsorption and Multifractal Theory and Its Role in $CH_4$/$CO_2$ Gas Storage", Energy & Fuels, vol. 36, 2022, pp. 12085-12103.

* cited by examiner

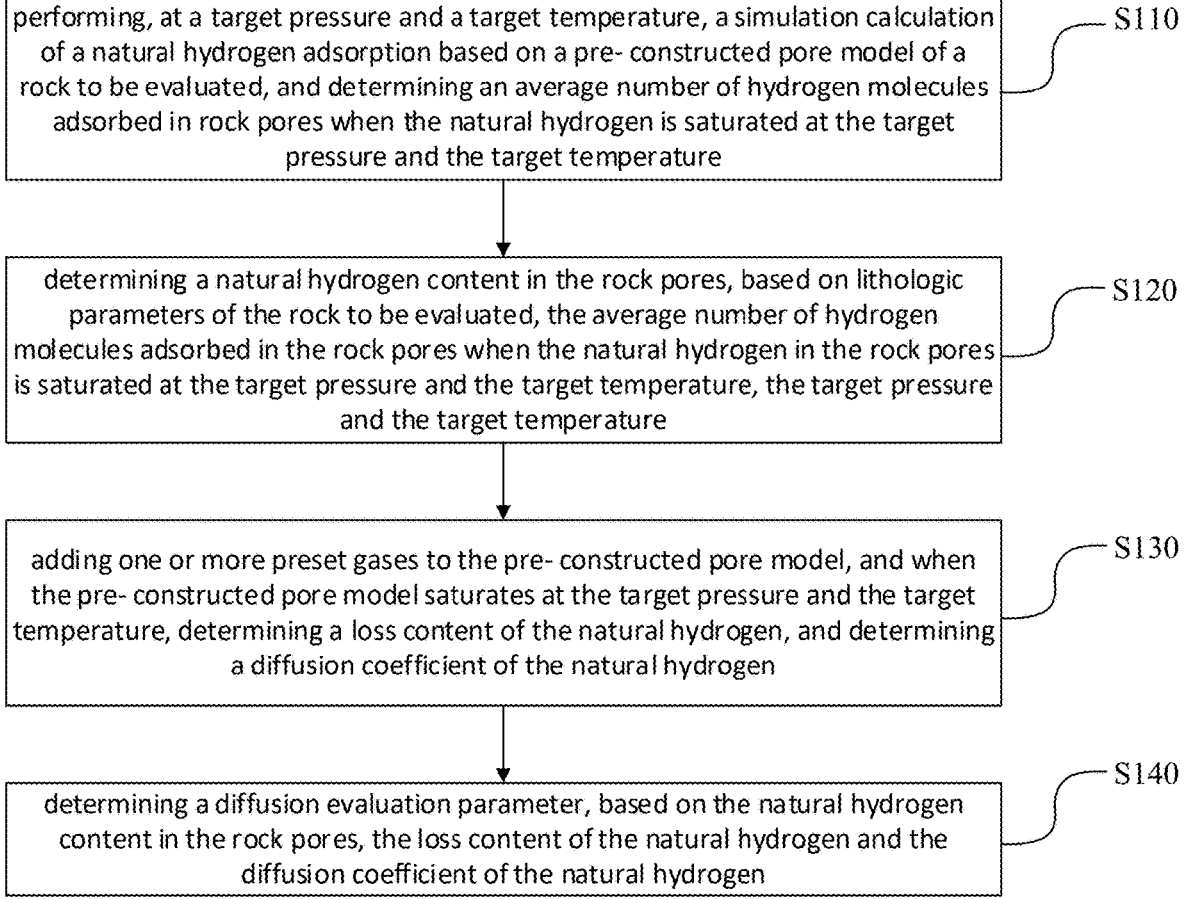

performing, at a target pressure and a target temperature, a simulation calculation of a natural hydrogen adsorption based on a pre- constructed pore model of a rock to be evaluated, and determining an average number of hydrogen molecules adsorbed in rock pores when the natural hydrogen is saturated at the target pressure and the target temperature —— S110 determining a natural hydrogen content in the rock pores, based on lithologic parameters of the rock to be evaluated, the average number of hydrogen molecules adsorbed in the rock pores when the natural hydrogen in the rock pores is saturated at the target pressure and the target temperature, the target pressure and the target temperature —— S120 adding one or more preset gases to the pre- constructed pore model, and when the pre- constructed pore model saturates at the target pressure and the target temperature, determining a loss content of the natural hydrogen, and determining a diffusion coefficient of the natural hydrogen —— S130 determining a diffusion evaluation parameter, based on the natural hydrogen content in the rock pores, the loss content of the natural hydrogen and the diffusion coefficient of the natural hydrogen —— S140

Fig. 1

I (a)-(c): full aperture distribution of three different rock cores

II(a)-(c): pore throat diameter distribution of three different rock cores

III(a)-(c): pore models constructed for three different types of rocks

METHOD, APPARATUS, AND DEVICE FOR EVALUATING DYNAMIC DIFFUSION OF NATURAL HYDROGEN IN ROCK PORES

CROSS-REFERENCE TO RELATED APPLICATIONS

This application is a continuation application of International Application No. PCT/CN2024/109100, filed on Aug. 1, 2024 and entitled "method, apparatus and device for evaluating dynamic diffusion of natural hydrogen in rock pores," which claims priority to Chinese Patent Application No. CN 202410786591.3, filed on Jun. 18, 2024 and entitled "method, apparatus and device for evaluating dynamic diffusion of natural hydrogen in rock pores." The disclosures of the aforementioned applications are hereby incorporated herein by reference in their entireties.

TECHNICAL FIELD

The present application relates to the technical field of oil gas exploration, and particularly relates to a method, an apparatus and a device for evaluating a dynamic diffusion of natural hydrogen in rock pores.

BACKGROUND

The gas diffusion coefficient is a physical quantity that describes the diffusion rate of gas molecules through a unit area per unit time. It measures the ability and rate of gas molecule diffusion and is one of the important parameters for describing the process of gas diffusion. The gas diffusion coefficient is related to multiple factors, such as the mass of gas molecules, temperature, pressure, molecular size, and the properties of the diffusion environment. In general, the larger the gas molecular mass, the smaller the diffusion coefficient; the higher the temperature, the greater the diffusion coefficient; the higher the pressure, the greater the diffusion coefficient.

The study of hydrogen diffusion coefficient can deepen the understanding of hydrogen migration and diffusion process from a dynamic perspective, solve practical problems in future natural hydrogen exploration, and contribute to the study of natural hydrogen enrichment areas. At present, the most commonly used gas diffusion coefficient model for calculation and evaluation is the dynamic model under constant temperature and pressure conditions. Evaluate the variation law of gas diffusion coefficient by establishing experimental conditions under different temperature and pressure conditions.

However, based on the data obtained from existing experimental methods, the constructed gas diffusion coefficient model has many errors in quantitatively evaluating the dynamic diffusion process of natural hydrogen, and cannot accurately evaluate the diffusion process of natural hydrogen.

SUMMARY

These and other problems are generally solved or circumvented, and technical advantages are generally achieved, by embodiments of the present application which provide a method, an apparatus and a device for evaluating a dynamic diffusion of natural hydrogen in rock pores.

Technical Problems

To overcome the problems existing in related technologies, the present application provides a method, an apparatus and a device for evaluating a dynamic diffusion of natural hydrogen in rock pores, which can solve the problem of high errors and inaccuracies in the current evaluation methods for the diffusion process of natural hydrogen.

Technical Solutions

In a first aspect, embodiments of the present application provide a method for evaluating a dynamic diffusion of natural hydrogen in rock pores, including:

performing, at a target pressure and a target temperature, a simulation calculation of a natural hydrogen adsorption based on a pre-constructed pore model of a rock to be evaluated, and determining, based on the simulation calculation, an average number of hydrogen molecules adsorbed in rock pores of the rock when natural hydrogen in the rock pores is saturated at the target pressure and the target temperature;

determining a natural hydrogen content in the rock pores, based on lithologic parameters of the rock to be evaluated, the average number of hydrogen molecules adsorbed in the rock pores when the natural hydrogen in the rock pores is saturated at the target pressure and the target temperature, and the target pressure and the target temperature, where the lithologic parameters include a pore diameter of the rock to be evaluated, pore type influence coefficients of the rock to be evaluated, and a pore specific surface area of the rock to be evaluated;

adding one or more preset gases to the pre-constructed pore model, and when the pore model saturates at the target pressure and the target temperature, determining a loss content of the natural hydrogen in the rock pores, and determining a diffusion coefficient of the natural hydrogen, where the one or more preset gases are one or more gases other than the natural hydrogen; and determining a diffusion evaluation parameter of the natural hydrogen in the rock pores, based on the natural hydrogen content in the rock pores, the loss content of the natural hydrogen and the diffusion coefficient of the natural hydrogen.

In one possible implementation, a construction process of the pre-constructed pore model includes:

determining a full aperture distribution of the rock to be evaluated and a pore throat diameter distribution of the rock to be evaluated, based on target test data of the rock to be evaluated, where the target test data includes data of a scanning electron microscope of the rock, data of a high-pressure mercury intrusion of the rock, and adsorption test data of a carbon dioxide and a nitrogen of the rock; and constructing the pre-constructed pore model of the rock to be evaluated, based on the full aperture distribution, the pore throat diameter distribution and a mineral composition of the rock to be evaluated.

In one possible implementation, determining the natural hydrogen content in the rock pores, based on the lithologic parameters of the rock to be evaluated, the average number of hydrogen molecules adsorbed in the rock pores when the natural hydrogen in the rock pores is saturated at the target pressure and the target temperature, and the target pressure and the target temperature, includes:

inputting, into a pre-constructed ideal model for a natural hydrogen content prediction, the lithologic parameters of the rock to be evaluated, the average number of hydrogen molecules adsorbed in the rock pores when the natural hydrogen in the rock pores is saturated at the target pressure and the target temperature, and the target pressure and the target temperature, to obtain a natural hydrogen content in the rock pores;

the pre-constructed ideal model for the natural hydrogen content prediction is represented as:

$$V_{1H2} = \sum\nolimits_{i=1}^{n} K_i(aT + bP + cD + dS) \times V_m \times \frac{N}{N_A};$$

$K_i$ is an ith pore type influence coefficient; n is a total number of the pore type influence coefficients; T is a formation temperature; P is a formation pressure; D is the pore diameter; S is the pore specific surface area; $V_m$ is a gas volume under a standard condition; N is the average number of hydrogen molecules; $N_A$ is an avogadro constant; and a, b, c, and d are fitting constants obtained based on training samples, respectively.

In one possible implementation, adding the one or more preset gases to the pre-constructed pore model, and when the pre-constructed pore model saturates at the target pressure and the target temperature, determining the loss content of the natural hydrogen, includes:

adding the one or more preset gases to the pre-constructed pore model, and when the pore model saturates at the target pressure and the target temperature, determining a number of hydrogen molecules diffusing out of the rock pores; and determining the loss content of the natural hydrogen, based on the number of hydrogen molecules diffusing out of the rock pores and a preset hydrogen loss model, where the preset hydrogen loss model is determined based on the number of hydrogen molecules diffusing out of the rock pores and the gas volume under the standard condition.

In one possible implementation, the preset hydrogen loss model is represented as:

$$V_{2H2} = \frac{N'}{N_A} \times V_m;$$

$V_m$ is a gas volume under a standard conditions; N' is the number of hydrogen molecules diffusing out of the rock pores; and $N_A$ is an avogadro constant.

In one possible implementation, determining the diffusion coefficient of the natural hydrogen includes:

determining the diffusion coefficient of the natural hydrogen based on a preset diffusion coefficient correction model;

the diffusion coefficient of the natural hydrogen is:

$$DT_{H2} = \sum\nolimits_{i=1}^{n} K_i\left(hT + rP + kD + eR + x\sum\nolimits_{j=1}^{m} DT_j\right).$$

$K_i$ is an ith pore type influence coefficient; n is the total number of the pore type influence coefficients; T is the formation temperature; P is the formation pressure; D is the pore diameter; R is a pore throat channel diameter of the rock to be evaluated; $DT_j$ is a diffusion coefficient of a jth preset gas of the one or more preset gases in the rock pores; m is a number of types of the one or more preset gases; and h, r, k, e and x are fitting constants obtained based on training samples, respectively.

In one possible implementation, determining the diffusion evaluation parameter, based on the natural hydrogen content in the rock pores, the loss content of the natural hydrogen and the diffusion coefficient of the natural hydrogen, includes:

inputting, into a pre-constructed diffusion evaluation model, the natural hydrogen content in the rock pores, the loss content of the natural hydrogen and the diffusion coefficient of the natural hydrogen, to obtain the diffusion evaluation parameter of the natural hydrogen in the rock pores of the rock to be evaluated;

where the pre-constructed diffusion evaluation model is represented as:

$$TC = \frac{V_{2H2}}{V_{1H2} \times DT_{H2}};$$

$DT_{H2}$ is the diffusion coefficient of the natural hydrogen; $V_{2H2}$ is the loss content of the natural hydrogen; and $V_{1H2}$ is the natural hydrogen content in the rock pores.

In a second aspect, embodiments of the present application provide an apparatus for evaluating a dynamic diffusion of natural hydrogen in rock pores, including:

a first determining module, being configured to perform, at a target pressure and a target temperature, a simulation calculation of a natural hydrogen adsorption based on a pre-constructed pore model of a rock to be evaluated, and determine, based on the simulation calculation, an average number of hydrogen molecules adsorbed in rock pores of the rock when the natural hydrogen in the rock pores is saturated at the target pressure and the target temperature;

a second determining module, being configured to determine a natural hydrogen content in the rock pores, based on lithologic parameters of the rock to be evaluated, the average number of hydrogen molecules adsorbed in the rock pores when the natural hydrogen in the rock pores is saturated at the target pressure and the target temperature, and the target pressure and the target temperature, the lithologic parameters includes a pore diameter of the rock to be evaluated, pore type influence coefficients of the rock to be evaluated, and a pore specific surface area of the rock to be evaluated;

a third determining module, being configured to add one or more preset gases to the pre-constructed pore model, and when the pre-constructed pore model saturates at the target pressure and the target temperature, determine a loss content of the natural hydrogen in the rock pores, and determine a diffusion coefficient of the natural hydrogen, where the one or more preset gases are one or more gases other than the natural hydrogen; and a fourth determining module, being configured to determine a diffusion evaluation parameter of the natural hydrogen in the rock pores, based on the natural hydrogen content in the rock pores, the loss content of the natural hydrogen and the diffusion coefficient of the natural hydrogen.

In a third aspect, embodiments of the present application provide an electronic device including a non-transitory memory and a processor, where the non-transitory memory is configured to store a computer program, and the processor is configured to call and run the computer program stored in the memory, and execute the steps of the method for evaluating the dynamic diffusion of the natural hydrogen in the rock pores described in the first aspect or any possible implementation of the first aspect.

In a fourth aspect, embodiments of the present application provide a non-transitory computer-readable storage medium, the non-transitory computer-readable storage medium storing a computer program, where the computer program, when executed by a processor, cause the processor to perform the steps of the method for evaluating the dynamic diffusion of the natural hydrogen in the rock pores described in the first aspect or any possible implementation of the first aspect.

It is apparent to those of ordinary skill in the art that the general description above and the detailed description in the following text are only illustrative and explanatory, and cannot limit this specification.

Advantageous Effects of the Disclosure

The method, the apparatus and the device for evaluating the dynamic diffusion of the natural hydrogen in the rock pores provided in the application first involve performing, at a target pressure and a target temperature, a simulation calculation of a natural hydrogen adsorption based on a pre-constructed pore model of a rock to be evaluated, and determining, based on the simulation calculation, an average number of hydrogen molecules adsorbed in rock pores of the rock when the natural hydrogen is saturated at the target pressure and the target temperature. Next, determining a natural hydrogen content in the rock pores, based on lithologic parameters of the rock to be evaluated, the average number of hydrogen molecules adsorbed in the rock pores when the natural hydrogen in the rock pores is saturated at the target pressure and the target temperature, and the target pressure and the target temperature. Then, adding one or more preset gases to the pre-constructed pore model, and when the pre-constructed pore model saturates at the target pressure and the target temperature, determining a loss content of the natural hydrogen, and determining a diffusion coefficient of the natural hydrogen. Finally, determining a diffusion evaluation parameter of the natural hydrogen in the rock pores, based on the natural hydrogen content in the rock pores, the loss content of the natural hydrogen and the diffusion coefficient of the natural hydrogen. By establishing a pore model for molecular dynamics simulation under geological conditions, the natural hydrogen content in the rock pores, the loss content of the natural hydrogen, and the diffusion coefficient of the natural hydrogen were determined based on the established pore model, thus achieving quantitative evaluation of the dynamic diffusion of the natural hydrogen in the rock pores, and the evaluation results were more accurate.

BRIEF DESCRIPTION OF THE DRAWINGS

In order to provide a clearer explanation of the technical solution in the embodiments of the present application, a brief introduction will be given below to the accompanying drawings required in the embodiments or prior art descriptions. It is evident that the accompanying drawings in the following description are only some embodiments of the present application. For those skilled in the art, other accompanying drawings can be obtained based on these drawings without the need for creative labor.

FIG. 1 is a flowchart of a method for evaluating a dynamic diffusion of natural hydrogen in rock pores provided in an embodiment of the present application;

DETAILED DESCRIPTION OF ILLUSTRATIVE EMBODIMENTS

In the following description, specific details such as specific system architecture, technology, etc. are proposed for the purpose of illustration rather than limitation, in order to thoroughly understand the embodiments of the present application. However, those skilled in the art should be aware that this application can also be implemented in other embodiments without these specific details. In other cases, detailed descriptions of well-known systems, devices, circuits, and methods may be omitted to avoid unnecessary details hindering the description of the present application.

In order to clarify the purpose, technical solution, and advantages of the present application, specific embodiments will be described below in conjunction with the accompanying drawings.

The migration of natural hydrogen in geological environments is an irregular diffusion movement of natural hydrogen, and its diffusion strength is influenced by the coupling effect of temperature, pressure, and reservoir medium in the underground environment. Although existing research has focused on detecting the hydrogen permeation concentration in shallow soil of the "fairy circle" on the surface, the diffusion ability of natural hydrogen undergoes significant changes during its migration from deep to soil. Quantitative evaluation of deep natural hydrogen diffusion based solely on the "fairy circle" cannot fully and accurately characterize the loss content of natural hydrogen. There are also many existing studies and experiments on diffusion coefficient, but they cannot achieve the dynamic changes of diffusion coefficient during the diffusion process of natural hydrogen, and there is no correct understanding of the mathematical relationship between diffusion coefficient, an evaluation parameter for measuring gas movement ability, and the loss content of natural hydrogen. Therefore, a comprehensive and accurate evaluation index has not been proposed for the quantitative evaluation of dynamic diffusion of natural hydrogen, which cannot meet the evaluation needs of the vast majority of future exploration and development work of natural hydrogen.

In order to solve the existing technical problems, the embodiments of the present application provide a method, an apparatus and a device for evaluating a dynamic diffusion of natural hydrogen in rock pores. Firstly, the method for evaluating the dynamic diffusion of the natural hydrogen in the rock pores provided in the embodiments of the present application will be introduced.

Figure 2:
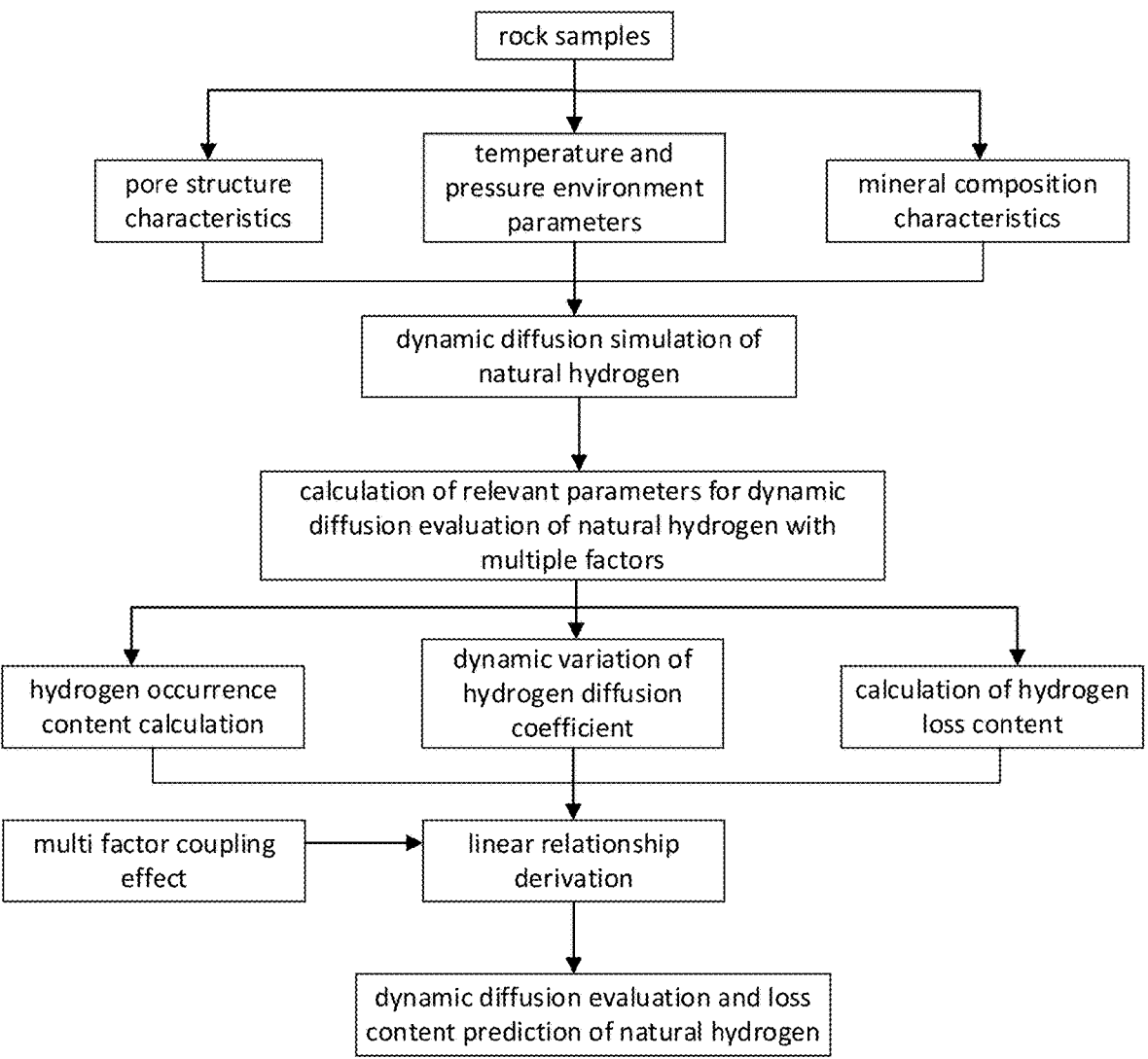
FIG. 2 is a process diagram of a method for evaluating a dynamic diffusion of natural hydrogen in rock pores provided in an embodiment of the present application.

Referring to FIG. 1 and FIG. 2, they respectively show the implementation flowchart and flowchart of the method for evaluating the dynamic diffusion of the natural hydrogen in the rock pores provided by the embodiments of the present application. The details are as follows:

S110, performing, at a target pressure and a target temperature, a simulation calculation of a natural hydrogen adsorption based on a pre-constructed pore model of a rock to be evaluated, and determining, based on the simulation calculation, an average number of hydrogen molecules adsorbed in rock pores of the rock when the natural hydrogen in the rock pores is saturated at the target pressure and the target temperature.

In this embodiment, it is necessary to first construct the pore model of the rock to be evaluated, and then perform molecular dynamics calculations based on the pore model at different target temperatures and different target pressures. The pore model requires the use of computers for three-dimensional design, and the adsorption of natural hydrogen and preset gases needs to be simulated in computer software. Firstly, a series of computer-generated chemical atoms (such as aluminum atoms, oxygen atoms, silicon atoms, etc.) are used to establish corresponding mineral elemental structure models based on the lattice parameters of the minerals present inside the rock to be evaluated. Secondly, the number of mineral elemental structure models required for simulation calculation is calculated based on the content of the corresponding minerals. Once again, the pore model of the rock to be evaluated is obtained by randomly mixing and arranging the established mineral monomers in a virtual space with a volume equal to the rock sample taken, using a computer. Finally, the pore model of the rock to be evaluated is structurally optimized through computer optimization until the specific surface area, total pore volume, and pore diameter distribution of the pore model of the rock to be evaluated are approximately equal to the results obtained through experimental measurements. The above process is relatively complex, requiring a lot of numerical calculations and simulations, and taking a long time. The simulation difficulty of setting various parameters is high, and it needs to be executed by a computer.

Figure 3:
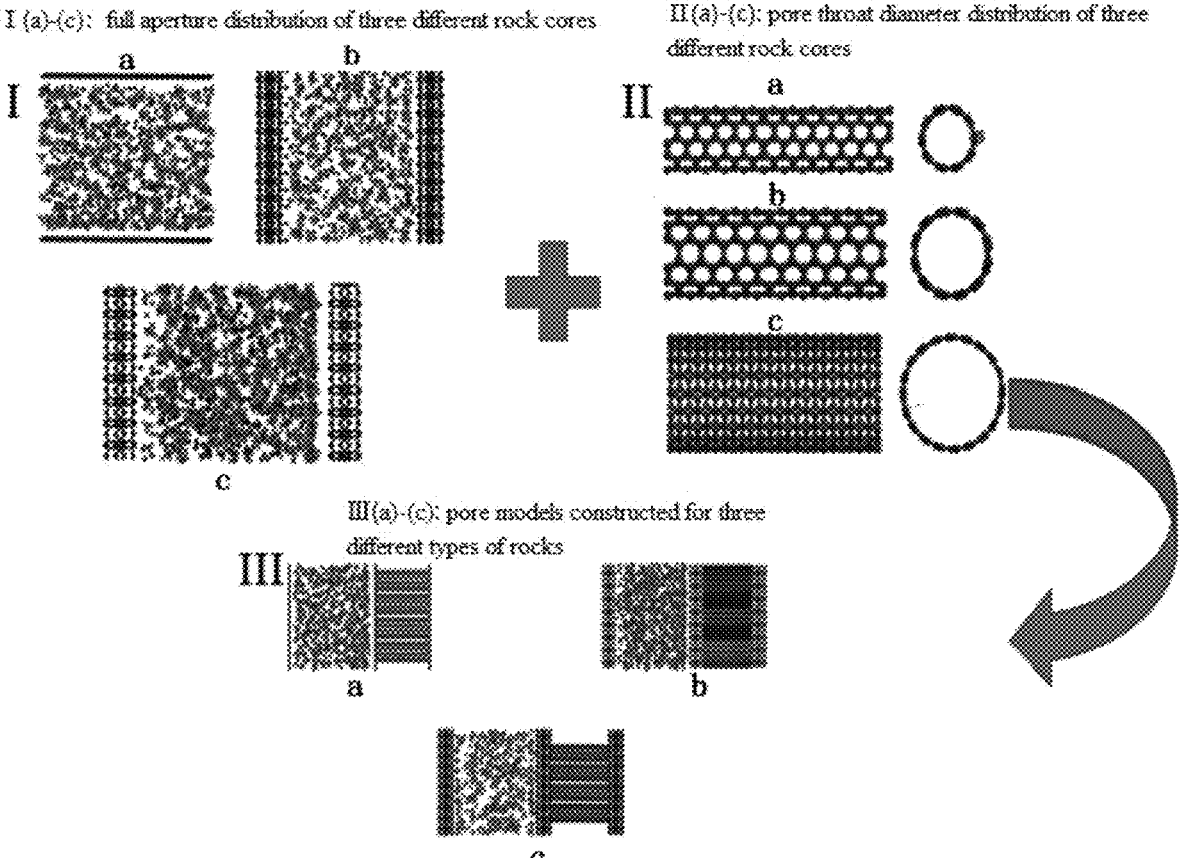
FIG. 3 is a schematic diagram of constructing a pore model provided in an embodiment of the present application.

In some embodiments, the pore model of the rock to be evaluated can be determined based on the target layer core of the rock to be evaluated, and the specific process of determination is as follows:

As shown in FIG. 2, firstly, based on the target test data of the rock to be evaluated, such as data of a scanning electron microscope, data of a high-pressure mercury intrusion, and adsorption test data of a carbon dioxide and a nitrogen, a full aperture distribution of the rock to be evaluated and a pore throat diameter distribution of the rock to be evaluated can be determined. I in FIG. 3 represents the full aperture distribution of three different rock cores, as shown in diagrams I(a)-(c), while II in FIG. 3 represents the pore throat diameter distribution of three different rock cores, as shown in diagrams II(a)-(c). Where the abbreviation for the scanning electron microscope is SEM, which can be widely used in micro research in fields such as life sciences, physics, chemistry, earth sciences, materials science, etc. For example, in earth sciences, it includes crystallography, mineralogy, mineral deposits, sedimentology, astrogeology, oil and gas geology, engineering geology, and structural geology. High-pressure mercury intrusion is commonly used to determine pore size.

Then, based on the obtained full aperture distribution, the obtained pore throat diameter distribution, and a mineral composition of the rock to be evaluated, a pore model of the rock to be evaluated is constructed. That is, the rock to be evaluated is collected in the area to be explored, and rock physics data is collected by using scanning electron microscopy and high-pressure mercury intrusion. At the same time, adsorption tests are conducted using carbon dioxide and oxygen to comprehensively determine the full aperture distribution and the pore throat diameter distribution of the rock to be evaluated. A simulated pore model is constructed using the actual pore conditions of the rock to be evaluated. As shown in FIG. 3, III represents the pore models constructed for three different types of rocks, as shown in diagrams III(a)-(c).

Based on the constructed pore model of the rock to be evaluated, the natural hydrogen adsorption simulation calculations are performed at the target pressure and the target temperature. Adsorption simulation calculation simulates the adsorption of hydrogen molecules in the pore model by changing the number of hydrogen molecules in the pore model. That is, hydrogen molecules are randomly created or deleted at any position in the pore model to maintain the temperature and pressure conditions input during simulation calculation until the pore model of the saturated hydrogen reaches an equilibrium state, at which the total energy in the system is the lowest. Thus, the average number of hydrogen molecules adsorbed in the rock pores when the natural hydrogen in the rock pores is saturated at the target temperature and the target pressure can be determined.

S120, determining a natural hydrogen content in the rock pores, based on lithologic parameters of the rock to be evaluated, the average number of hydrogen molecules adsorbed in the rock pores when the natural hydrogen in the rock pores is saturated at the target pressure and the target temperature, and the target pressure and the target temperature.

The natural hydrogen content in the rock pores is influenced by various factors such as temperature, pressure, and pore type. Therefore, when evaluating the diffusion of the natural hydrogen, it is necessary to first accurately determine the natural hydrogen content in the rock pores. The specific determination process is as follows:

Inputting, into a pre-constructed ideal model for a natural hydrogen content prediction, the lithologic parameters of the rock to be evaluated, the average number of hydrogen molecules adsorbed in the rock pores when the natural hydrogen in the rock pores is saturated at the target pressure and the target temperature, and the target pressure and the target temperature, to obtain a natural hydrogen content in the rock pores.

The lithologic parameters include a pore diameter of the rock to be evaluated, pore type influence coefficients of the rock to be evaluated, and a pore specific surface area of the rock to be evaluated.

The pre-constructed ideal model for the natural hydrogen content prediction is the linear relationship between the natural hydrogen content in the rock pores and influencing factors, specifically:

the pre-constructed ideal model for the natural hydrogen content prediction is represented as:

$$V_{1H2} = \sum_{i=1}^{m} K_i(aT + bP + cD + dS) \times V_m \times \frac{N}{N_A}.$$

$K_i$ is an ith pore type influence coefficient; n is a total number of the pore type influence coefficient; T is a formation temperature; P is a formation pressure; D is the pore diameter; S is the pore specific surface area; $V_m$ is a gas volume under a standard condition; N is the average number of hydrogen molecules; $N_A$ is an avogadro constant; and a, b, c, and d are fitting constants obtained based on training samples, respectively.

It should be noted that if the rock to be evaluated is a single type of rock, there is only one rock pore type influence coefficient. However, if the rock to be evaluated is a jointed rock, that is, two different types of rocks, there are two different rock pore type influence coefficients.

a, b, c, and d are determined by fitting historical simulation experiment data and collected data, that is, by fitting from a large number of training samples.

For jointed rocks, the natural hydrogen content in the rock pores is:

$$V_{1H2} =$$

$$K_1(aT + bP + cD + dS) \times V_m \times \frac{N}{N_A} + K_2(aT + bP + cD + dS) \times V_m \times \frac{N}{N_A}.$$

S130, adding one or more preset gases to the pre-constructed pore model, and when the pore model saturates at the target pressure and the target temperature, determining a loss content of the natural hydrogen in the rock pores, and determining a diffusion coefficient of the natural hydrogen.

The main measurement object is still the natural hydrogen, and the one or more preset gases such as methane, carbon dioxide, nitrogen, helium, etc. are added to the pore model. Add one or more preset gases based on the properties of the rock. Simulate the pore adsorption behavior of the pore model in the presence of one or more preset gases and the natural hydrogen. When the pore model saturates at the target pressure and the target temperature, it is necessary to first determine the number of hydrogen molecules diffusing out of the rock pores.

The calculation method for the number of hydrogen molecules diffusing out of the rock pores is also based on adsorption simulation calculation, which simulates the adsorption of hydrogen molecules in the pore model by changing the number of hydrogen molecules in the pore model. That is, hydrogen molecules are randomly created or deleted at any position in the pore model to maintain the temperature and pressure conditions input during simulation calculation, until the pore model of the saturated hydrogen reaches equilibrium state, at which the total energy in the system is the lowest. Thus, the number of hydrogen molecules adsorbed in the rock pores after adding the one or more preset gases at the target temperature and the target pressure can be determined. The number of hydrogen molecules diffusing out of the rock pores can be determined by the difference between the average number of hydrogen molecules adsorbed in the rock pores when the natural hydrogen is saturated at the target temperature and the target pressure and the number of hydrogen molecules adsorbed in the rock pores after adding one or more preset gases at the target temperature and the target pressure.

After determining the number of hydrogen molecules diffusing out of the rock pores, the loss content of the natural hydrogen can be determined based on the number of hydrogen molecules diffusing out of the rock pores and a preset hydrogen loss model.

The preset hydrogen loss model is determined based on the number of hydrogen molecules diffusing out of the rock pores and the gas volume under the standard conditions.

In some embodiments, the preset hydrogen loss model is represented as:

$$V_{2H2} = \frac{N'}{N_A} \times V_m.$$

$V_m$ is the gas volume under the standard conditions; N' is the number of hydrogen molecules diffusing out of the rock pores; and $N_A$ is the avogadro constant.

The diffusion coefficient of the natural hydrogen is determined based on a preset diffusion coefficient correction model.

The diffusion coefficient of the natural hydrogen is:

$$DT_{H2} = \sum\nolimits_{i=1}^{n} K_i \left( hT + rP + kD + eR + x \sum\nolimits_{j=1}^{m} DT_j \right).$$

$K_i$ is the ith pore type influence coefficient; n is the total number of the pore type influence coefficient; T is the formation temperature; P is the formation pressure; D is the pore diameter; R is a pore throat channel diameter of the rock to be evaluated; $DT_j$ is a diffusion coefficient of a jth preset gas of the one or more preset gases in the rock pores; m is the number of types of the one or more preset gases; and h, r, k, e and x are fitting constants obtained based on training samples, respectively.

It should be noted that if the rock to be evaluated is a single type of rock, there is only one rock pore type influence coefficient. However, if the rock to be evaluated is a jointed rock, that is, two different types of rocks, there are two different rock pore type influence coefficients.

h, r, k, e, and x are also determined by fitting historical simulation experiment data and collected data, that is, by fitting from a large number of training samples.

In some embodiments, the determination process of the diffusion coefficient DTj of any preset gas in the rock pores is as follows:

performing molecular dynamics simulation calculations on the pore model of saturated hydrogen based on the actual temperature and pressure conditions underground, where the molecular dynamics simulation calculations are based on Newton's laws of mechanics.

Newton's laws of mechanics is F=ma=dp/dt.

m is a mass of a particle; $a=d^2r/dt^2$ is an acceleration of the particle; F is a force applied to the particle, and p is a momentum of the particle.

Integrating the above equation over time, predicting the velocity and the position of particles after time t, and then obtaining the potential energy of particles after time t. Then calculate the stress state and acceleration of the particles using the formula. Repeating the above process can obtain the dynamic information of particles in the system at different time steps, such as Mean Squared Displacement (MSD). Therefore, the mean squared displacement MSD of any preset gas during diffusion can be directly obtained through molecular dynamics calculations, and a mean squared displacement-time function relationship graph can be established. According to Einstein's energy equation, ⅙ of the slope of the mean square displacement-time function relationship graph is established as the arbitrary gas diffusion coefficient $DT_{others}$.

$$DT_{others} = \frac{\Delta MSD}{6\Delta t}.$$

MSD is the mean squared displacement of any gas during diffusion process; t is time.

The diffusion coefficient $DT_j$ of each preset gas can be determined using the above process.

S140, determining a diffusion evaluation parameter of the natural hydrogen in the rock pores, based on the natural hydrogen content in the rock pores, the loss content of the natural hydrogen and the diffusion coefficient of the natural hydrogen.

Inputting, into a pre-constructed diffusion evaluation model, the natural hydrogen content in the rock pores, the loss content of the natural hydrogen and the diffusion coefficient of the natural hydrogen, to obtain the diffusion evaluation parameter of the natural hydrogen in the rock pores of the rock to be evaluated. By using this diffusion evaluation parameter, the diffusion of the natural hydrogen in the rock to be evaluated can be evaluated, based on which, whether the exploration area is rich in natural hydrogen can be determined and guidance of whether to explore the area in actual exploration can be provided.

The pre-constructed diffusion evaluation model is represented as:

$$TC = \frac{V_{2H2}}{V_{1H2} \times DT_{H2}}.$$

TC is the diffusion evaluation parameter; $DT_{H2}$ is the diffusion coefficient of the natural hydrogen; $V_{2H2}$ is the loss content of the natural hydrogen; and $V_{1H2}$ is the natural hydrogen content in the rock pores.

Using the value of TC as the standard, evaluate the dynamic content of natural hydrogen diffusion, as shown in the following table:

| | Quantitative evaluation parameter TC for natural hydrogen diffusion | | |
|---|---|---|---|
| | <1 | =1 | >1 |
| Degree of diffusion of natural hydrogen | strong | dynamic balance | weak |

Figure 4:
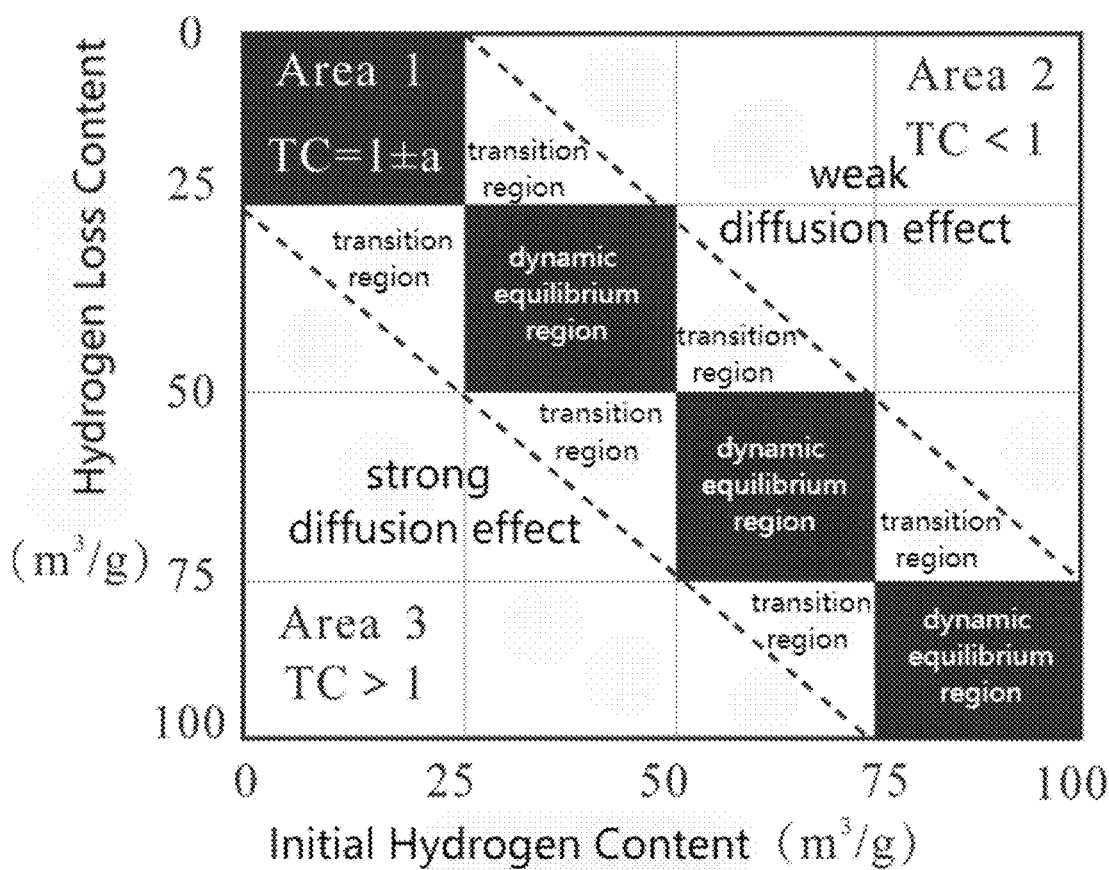
FIG. 4 is a schematic diagram of an evaluation interval for a dynamic diffusion of natural hydrogen provided in an embodiment of the present application.

As shown in FIG. 4, when TC=1, the diffusion coefficient is moderate, and the loss content of the natural hydrogen is dynamically balanced with the natural hydrogen content in the rock pores. When TC<1, $DT_{H2}$ is relatively large and the diffusion degree of the natural hydrogen is relatively enhanced. When TC>1, $DT_{H2}$ is relatively small and the diffusion degree of hydrogen is relatively weak. Alternatively, based on the natural hydrogen content in any known reservoir (field analysis or logging data), the corresponding hydrogen loss content in the reservoir can be calculated and predicted using the diffusion evaluation parameter TC.

The application regresses the essence of hydrogen migration as irregular diffusion of hydrogen molecules based on the pre-constructed pore model, which is not affected by other external characteristics or human factors, and the evaluation results are more scientific and objective. And based on the natural hydrogen content in the rock pores, the loss content of the natural hydrogen, and the diffusion coefficient of the natural hydrogen, the application determines the diffusion evaluation parameter, achieving a continuous numerical representation of "initial content-diffusion coefficient-loss content", which is in line with the dynamic characteristics of natural hydrogen migration and enrichment under actual geological conditions, and has practical guidance significance. The evaluation results are also more accurate.

The method for evaluating the dynamic diffusion of the natural hydrogen in the rock pores provided in the application first involves performing, at a target pressure and a target temperature, a simulation calculation of a natural hydrogen adsorption based on a pre-constructed pore model of a rock to be evaluated, and determining, based on the simulation calculation, an average number of hydrogen molecules adsorbed in rock pores of the rock when the natural hydrogen is saturated at the target pressure and the target temperature. Next, determining a natural hydrogen content in the rock pores, based on lithologic parameters of the rock to be evaluated, the average number of hydrogen molecules adsorbed in the rock pores when the natural hydrogen in the rock pores is saturated at the target pressure and the target temperature, and the target pressure and the target temperature. Then, adding one or more preset gases to the pre-constructed pore model, and when the pre-constructed pore model saturates at the target pressure and the target temperature, determining a loss content of the natural hydrogen, and determining a diffusion coefficient of the natural hydrogen. Finally, determining a diffusion evaluation parameter of the natural hydrogen in the rock pores, based on the natural hydrogen content in the rock pores, the loss content of the natural hydrogen and the diffusion coefficient of the natural hydrogen. By establishing a pore model for molecular dynamics simulation under geological conditions, the natural hydrogen content in the rock pores, the loss content of the natural hydrogen, and the diffusion coefficient of the natural hydrogen were determined based on the established pore model, thus achieving quantitative evaluation of the dynamic diffusion of the natural hydrogen in the rock pores, and the evaluation results were more accurate.

It should be understood that the size of the sequence numbers of each step in the above embodiments does not imply the order of execution. The order of execution of each process should be determined by its function and internal logic, and should not constitute any limitation on the implementation process of the present application.

Based on the method for evaluating the dynamic diffusion of the natural hydrogen in the rock pores provided in the above embodiments, the present application also provides a specific implementation method for an apparatus for evaluating the dynamic diffusion of the natural hydrogen in the rock pores applied to the method for evaluating the dynamic diffusion of the natural hydrogen in the rock pores. Please refer to the following implementation examples.

Figure 5:
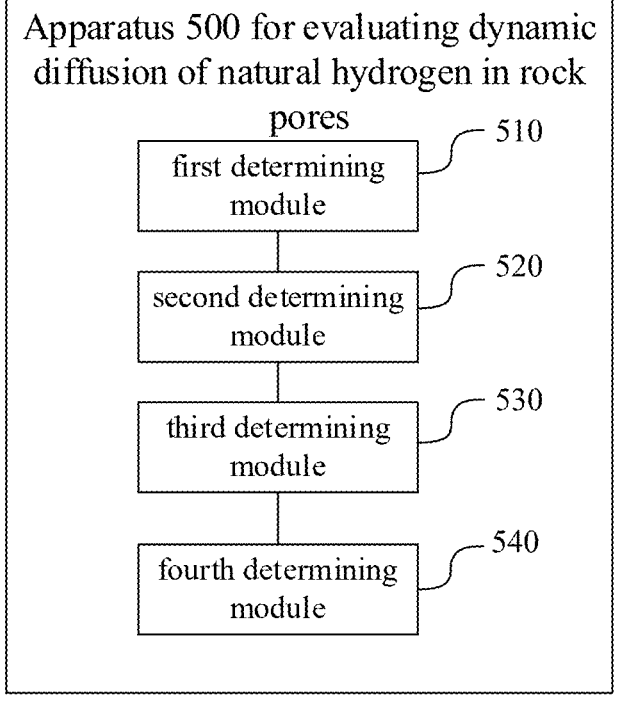
FIG. 5 is a structural schematic diagram of an apparatus for evaluating a dynamic diffusion of natural hydrogen in rock pores provided in an embodiment of the present application.

As shown in FIG. 5, the embodiment of the present application provides an apparatus 500 for evaluating the dynamic diffusion of the natural hydrogen in the rock pores, which includes:

A first determining module 510 is configured to perform, at a target pressure and a target temperature, a simulation calculation of a natural hydrogen adsorption based on a pre-constructed pore model of a rock to be evaluated, and determine, based on the simulation calculation, an average number of hydrogen molecules adsorbed in rock pores of the rock when the natural hydrogen in the rock pores is saturated at the target pressure and the target temperature.

A second determining module 520 is configured to determine a natural hydrogen content in the rock pores, based on lithologic parameters of the rock to be evaluated, the average number of hydrogen molecules adsorbed in the rock pores when the natural hydrogen in the rock pores is saturated at the target pressure and the target temperature, and the target pressure and the target temperature. The lithologic parameters include a pore diameter of the rock to be evaluated, pore type influence coefficients of the rock to be evaluated, and a pore specific surface area of the rock to be evaluated.

A third determining module 530 is configured to add one or more preset gases to the pre-constructed pore model, and when the pre-constructed pore model saturates at the target pressure and the target temperature, determine a loss content of the natural hydrogen in the rock pores, and determine a diffusion coefficient of the natural hydrogen. The one or more preset gases are one or more gases other than the natural hydrogen.

A fourth determining module 540 is configured to determine a diffusion evaluation parameter of the natural hydrogen in the rock pores, based on the natural hydrogen content in the rock pores, the loss content of the natural hydrogen and the diffusion coefficient of the natural hydrogen.

In one possible implementation, the first determining module 510 is configured to determine a full aperture distribution of the rock to be evaluated and a pore throat diameter distribution of the rock to be evaluated, based on target test data of the rock to be evaluated, where the target test data include data of a scanning electron microscope, data of a high-pressure mercury intrusion, and adsorption test data of a carbon dioxide and a nitrogen.

And the first determining module 510 is configured to construct the pre-constructed pore model of the rock to be evaluated, based on the full aperture distribution, the pore throat diameter distribution and a mineral composition of the rock to be evaluated.

In one possible implementation, the second determining module 520 is configured to input, into a pre-constructed ideal model for a natural hydrogen content prediction, the lithologic parameters of the rock to be evaluated, the average number of hydrogen molecules adsorbed in the rock pores when the natural hydrogen in the rock pores is saturated at the target pressure and the target temperature, and the target pressure and the target temperature, to obtain a natural hydrogen content in the rock pores.

The pre-constructed ideal model for the natural hydrogen content prediction is represented as:

$$V_{1H2} = \sum_{i=1}^{n} K_i(aT + bP + cD + dS) \times V_m \times \frac{N}{N_A}.$$

$K_i$ is an ith pore type influence coefficient; n is a total number of the pore type influence coefficients; T is a formation temperature; P is a formation pressure; D is the pore diameter; S is the pore specific surface area; $V_m$ is a gas volume under a standard condition; N is the average number of hydrogen molecules; $N_A$ is an avogadro constant; and a, b, c, and d are fitting constants obtained based on training samples, respectively.

In one possible implementation, the third determining module 530 is configured to add the one or more preset gases to the pre-constructed pore model, and when the pre-constructed pore model saturates at the target pressure and the target temperature, determine a number of hydrogen molecules diffusing out of the rock pores.

And the third determining module 530 is configured to determine the loss content of the natural hydrogen, based on the number of hydrogen molecules diffusing out of the rock pores and a preset hydrogen loss model, where the preset hydrogen loss model is determined based on the number of hydrogen molecules diffusing out of the rock pores and the gas volume under the standard condition.

In one possible implementation, the preset hydrogen loss model is represented as:

$$V_{2H2} = \frac{N'}{N_A} \times V_m.$$

$V_m$ is a gas volume under standard conditions; N' is the number of hydrogen molecules diffusing out of the rock pores; and $N_A$ is an avogadro constant.

In one possible implementation, the third determining module 530 is configured to determine the diffusion coefficient of the natural hydrogen based on a preset diffusion coefficient correction model.

The diffusion coefficient of the natural hydrogen is:

$$DT_{H2} = \sum_{i=1}^{n} K_i\left(hT + rP + kD + eR + x\sum_{j=1}^{m} DT_j\right).$$

$K_i$ is the ith pore type influence coefficient; n is the total number of the pore type influence coefficients; T is the formation temperature; P is the formation pressure; D is the pore diameter; R is a pore throat channel diameter of the rock to be evaluated; DTj is a diffusion coefficient of a jth preset gas of the one or more preset gases in the rock pores; m is the number of types of the one or more preset gases; and h, r, k, e and x are fitting constants obtained based on training samples, respectively.

In one possible implementation, the fourth determining module 540 is configured to input, into a pre-constructed diffusion evaluation model, the natural hydrogen content in the rock pores, the loss content of the natural hydrogen and the diffusion coefficient of the natural hydrogen, to obtain the diffusion evaluation parameter of the natural hydrogen in the rock pores of the rock to be evaluated.

The pre-constructed diffusion evaluation model is represented as:

$$TC = \frac{V_{2H2}}{V_{1H2} \times DT_{H2}}.$$

TC is the diffusion evaluation parameter; $DT_{H2}$ is the diffusion coefficient of the natural hydrogen; $V_{2H2}$ is the loss content of the natural hydrogen; and $V_{1H2}$ is the natural hydrogen content in the rock pores.

Figure 6:
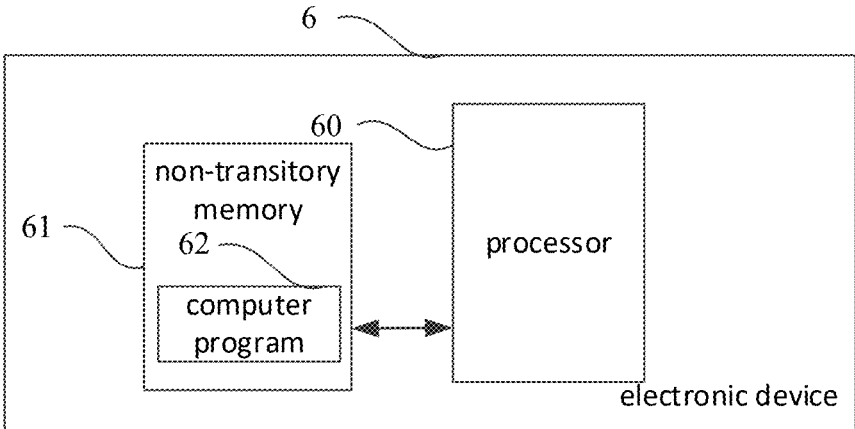
FIG. 6 is a structural schematic diagram of an electronic device provided in an embodiment of the present application.

FIG. 6 is a schematic diagram of an electronic device provided in the embodiments of the present application. As shown in FIG. 6, the electronic device 6 of this embodiment includes a processor 60, a memory 61, and a computer program 62 stored in the memory 61 and executable on the processor 60. When the processor 60 executes the computer program 62, the steps of the method for evaluating the dynamic diffusion of the natural hydrogen in the rock pore described above are implemented, such as steps S110 to S140 shown in FIG. 1. Alternatively, when the processor 60 executes the computer program 62, it implements the functions of each module in the above-mentioned device embodiments, such as the functions of modules 510 to 540 shown in FIG. 5.

By way of example, the computer program 62 can be divided into one or more modules, which are stored in the memory 61 and executed by the processor 60 to complete the present application. The one or more modules may be a series of computer program instruction segments capable of performing specific functions, which are used to describe the execution process of the computer program 62 in the electronic device 6. For example, the computer program 62 can be divided into modules 510 to 540 as shown in FIG. 5.

The electronic device 6 may include, but is not limited to, a processor 60 and a memory 61. Technicians in this field can understand that FIG. 6 is only an example of electronic device 6 and does not constitute a limitation on the electronic device 6. It may include more or fewer components than shown in the diagram, or combine certain components, or different components. For example, the electronic device 6 may also include input/output devices, network access devices, buses, etc.

The processor 60 can be a central processing unit (CPU), as well as other general-purpose processors, digital signal processors (DSP), application specific integrated circuits (ASIC), field programmable gate arrays (FPGA), or other programmable logic devices, discrete gates or transistor logic devices, discrete hardware components, etc. A general-purpose processor can be a microprocessor or any conventional processor.

The memory 61 may be an internal storage unit of the electronic device 6, such as a hard disk or memory of the electronic device 6. The memory 61 can also be an external storage device of the electronic device 6, such as a plug-in hard drive, smart media card (SMC), secure digital (SD) card, flash card, etc. equipped on the electronic device 6. Furthermore, the memory 61 may also include both internal storage units of the electronic device 6 and external storage devices. The memory 61 is used to store the computer program and other programs and data required by the electronic device 6. The memory 61 can also be used to temporarily store data that has been or will be output.

Technicians in the relevant field can clearly understand that, for the convenience and simplicity of description, only the division of the above functional units and modules is given as an example. In practical applications, the above functions can be assigned to different functional units or modules as needed, that is, the internal structure of the device can be divided into different functional units or modules to complete all or part of the functions described above. The various functional units and modules in the embodiments can be integrated into one processing unit, or physically exist separately, or two or more units can be integrated into one unit. The integrated units can be implemented in the form of hardware or software functional units. In addition, the specific names of each functional unit and module are only for the purpose of distinguishing them from each other and are not intended to limit the scope of protection of the present application. The specific working process of the units and modules in the above system can refer to the corresponding process in the previous method implementation examples, and will not be repeated here.

In the above embodiments, the description of each embodiment has its own emphasis. For the parts that are not detailed or recorded in one embodiment, please refer to the relevant descriptions of other embodiments.

Ordinary technicians in this field can realize that the units and algorithm steps described in the embodiments disclosed in this article can be implemented through electronic hardware, or a combination of computer software and electronic hardware. Whether these functions are executed in hardware or software depends on the specific application and design constraints of the technical solution. Professional technicians can use different methods to achieve the described functions for each specific application, but such implementation should not be considered beyond the scope of the present application.

In the embodiments provided in the present application, it should be understood that the disclosed devices/electronic devices and methods can be implemented in other ways. For example, the embodiments of the device/electronic device described above are only illustrative. For example, the division of modules or units is only a logical functional division. In practical implementation, there may be other division methods, such as multiple units or components being combined or integrated into another system, or some features being ignored or not executed. On the other hand, the mutual coupling or direct coupling or communication connection displayed or discussed can be indirect coupling or communication connection through some interface, device or unit, which can be electrical, mechanical or other forms.

The units described as separate components may or may not be physically separated, and the components displayed as units may or may not be physical units, i.e. they can be located in one place or distributed across multiple network units. Some or all of the units can be selected according to actual needs to achieve the purpose of this embodiment.

In addition, the functional units in various embodiments of the present application can be integrated into one processing unit, physically exist separately, or integrate two or more units into one unit. The integrated units mentioned above can be implemented in the form of hardware or software functional units.

When the integrated modules/units are implemented in the form of software functional units and sold or used as independent products, they can be stored in a non-transitory computer-readable storage medium. Based on this understanding, the present application can implement all or part of the process in the above embodiments, or it can be completed by instructing relevant hardware through a computer program. The computer program can be stored in a non-transitory computer-readable storage medium, and when executed by the processor, it can implement the steps of the evaluation method for dynamic diffusion of natural hydrogen gas in various rock pores. Among them, the computer program includes computer program code, which can be in the form of source code, object code, executable file, or some intermediate form. The non-transitory computer-readable storage medium may include any entity or device capable of carrying the computer program code, recording media, USB flash drives, portable hard drives, magnetic disks, optical disks, computer memory, read-only memory (ROM), random access memory (RAM), carrier signals, telecommunications signals, and software distribution media.

The above embodiments are only used to illustrate the technical solution of the present application, and not to limit it. Although the present application has been described in detail with reference to the aforementioned embodiments, ordinary technical personnel in the art should understand that they can still modify the technical solutions recorded in the aforementioned embodiments, or equivalently replace some of the technical features therein. And these modifications or replacements do not separate the essence of the corresponding technical solutions from the spirit and scope of the technical solutions in each embodiment of the present application, and should be included in the scope of protection of the present application.

The invention claimed is:

1. A method for evaluating a natural hydrogen diffusion in rock pores, comprising:

collecting, at a target pressure and a target temperature, rock physics data of a rock to be evaluated using a scanning electron microscopy and a high-pressure mercury intrusion, determining, based on the collected rock physics data of the rock, a full aperture distribution and a pore throat diameter distribution of the rock to be evaluated using adsorption tests, and determining a mineral composition of the rock to be evaluated, to perform a simulation calculation of a natural hydrogen adsorption using a pre-constructed pore model of the rock to be evaluated, and determining, based on the simulation calculation, an average number of hydrogen molecules adsorbed in rock pores of the rock when natural hydrogen in the rock pores is saturated at the target pressure and the target temperature, wherein the pre-constructed pore model is a simulated pore model built using actual pore conditions of the rock to be evaluated, the actual pore conditions comprising the full aperture distribution, the pore throat diameter distribution and the mineral composition of the rock, and a specific surface area, a total pore volume and a pore diameter distribution of the pre-constructed pore model of the rock to be evaluated being approximately equal to results obtained through experimental measurements;

inputting, into a pre-constructed ideal model for a natural hydrogen content prediction, lithologic parameters of the rock to be evaluated, the average number of hydrogen molecules adsorbed in the rock pores when the natural hydrogen in the rock pores is saturated at the target pressure and the target temperature, and the target pressure and the target temperature, to obtain a natural hydrogen content $V_{1H2}$ in the rock pores, wherein the lithologic parameters comprise a pore diameter of the rock to be evaluated, pore type influence coefficients of the rock to be evaluated, and a pore specific surface area of the rock to be evaluated, wherein the pre-constructed ideal model is a linear relationship between the natural hydrogen content $V_{1H2}$ in the rock pores and influencing factors, and is configured to predict the natural hydrogen content $V_{1H2}$;

adding one or more gases other than the natural hydrogen to the pre-constructed pore model, and when the pre-constructed pore model saturates at the target pressure and the target temperature, determining a loss content of the natural hydrogen in the rock pores, and determining a diffusion coefficient $DT_{H2}$ of the natural hydrogen based on a preset diffusion coefficient correction model, wherein the preset diffusion coefficient correction model is a relationship between the diffusion coefficient $DT_{H2}$ of the natural hydrogen and one or more diffusion coefficients of the one or more gases, and is configured to determine the diffusion coefficient $DT_{H2}$ of the natural hydrogen; and generating a diffusion evaluation parameter of the natural hydrogen in the rock pores based on the natural hydrogen content $V_{1H2}$ in the rock pores, and the loss content of the natural hydrogen and the diffusion coefficient $DT_{H2}$ of the natural hydrogen, the diffusion evaluation parameter quantitatively representing dynamic diffusion of the natural hydrogen in the rock under geological conditions, wherein the method provides a quantitative evaluation of the dynamic diffusion of the natural hydrogen in the rock pores of the rock by collecting specific rock physics data of the rock and by calculation and simulation using models and the collected specific rock physics data;

wherein the pre-constructed ideal model for the natural hydrogen content prediction is represented as:

$$V_{1H2} = \sum\nolimits_{i=1}^{n} K_i(aT + bP + cD + dS) \times V_m \times \frac{N}{N_A},$$

and the diffusion coefficient of the natural hydrogen is:

$$DT_{H2} = \sum\nolimits_{i=1}^{n} K_i\left(hT + rP + kD + eR + x\sum\nolimits_{j=1}^{m} DT_j\right),$$

$K_i$ is an ith pore type influence coefficient, n is a total number of the pore type influence coefficients, T is a formation temperature, P is a formation pressure, D is the pore diameter, S is the pore specific surface area, $V_m$ is a gas volume under a standard condition, N is the average number of hydrogen molecules, $N_A$ is an avogadro constant, a, b, c and d are fitting constants obtained based on training samples, respectively, R is a pore throat channel diameter of the rock to be evaluated, $DT_j$ is a diffusion coefficient of a jth gas of the one or more gases in the rock pores, m is a number of types of the one or more gases, and h, r, k, e and x are fitting constants obtained based on training samples, respectively.

2. The method according to claim 1, wherein the pre-constructed pore model is constructed by a construction process comprising:

determining the full aperture distribution of the rock to be evaluated and the pore throat diameter distribution of the rock to be evaluated, based on target test data of the rock to be evaluated, wherein the target test data comprises data of the scanning electron microscope of the rock, data of the high-pressure mercury intrusion of the rock, and adsorption test data of a carbon dioxide and a nitrogen of the rock; and constructing the pre-constructed pore model of the rock to be evaluated, based on the full aperture distribution, the pore throat diameter distribution and the mineral composition of the rock to be evaluated.

3. The method according to claim 2, wherein determining the diffusion evaluation parameter, based on the natural hydrogen content in the rock pores, the loss content of the natural hydrogen and the diffusion coefficient of the natural hydrogen, comprises:

inputting, into a pre-constructed diffusion evaluation model, the natural hydrogen content in the rock pores, the loss content of the natural hydrogen and the diffusion coefficient of the natural hydrogen, to obtain the diffusion evaluation parameter TC of the natural hydrogen in the rock pores of the rock to be evaluated; and wherein the pre-constructed diffusion evaluation model is represented as:

$$TC = \frac{V_{2H2}}{V_{1H2} \times DT_{H2}},$$

DT$_{H2}$ is the diffusion coefficient of the natural hydrogen, V$_{2H2}$ is the loss content of the natural hydrogen, and V$_{1H2}$ is the natural hydrogen content in the rock pores.

4. The method according to claim 1, wherein adding the one or more gases to the pre-constructed pore model, and when the pore model saturates at the target pressure and the target temperature, determining the loss content of the natural hydrogen, comprises:

adding the one or more gases to the pre-constructed pore model, and when the pore model saturates at the target pressure and the target temperature, determining a number of hydrogen molecules diffusing out of the rock pores; and determining the loss content V$_{2H2}$ of the natural hydrogen, based on the number of hydrogen molecules diffusing out of the rock pores and a preset hydrogen loss model, wherein the preset hydrogen loss model is determined based on the number of hydrogen molecules diffusing out of the rock pores and the gas volume under the standard condition.

5. The method according to claim 4, wherein the preset hydrogen loss model is represented as:

$$V_{2H2} = \frac{N'}{N_A} \times V_m,$$

N' is the number of hydrogen molecules diffusing out of the rock pores, N$_A$ is the avogadro constant, and V$_m$ is the gas volume under the standard condition.

6. The method according to claim 5, wherein determining the diffusion evaluation parameter, based on the natural hydrogen content in the rock pores, the loss content of the natural hydrogen and the diffusion coefficient of the natural hydrogen, comprises:

inputting, into a pre-constructed diffusion evaluation model, the natural hydrogen content in the rock pores, the loss content of the natural hydrogen and the diffusion coefficient of the natural hydrogen, to obtain the diffusion evaluation parameter TC of the natural hydrogen in the rock pores of the rock to be evaluated; and wherein the pre-constructed diffusion evaluation model is represented as:

$$TC = \frac{V_{2H2}}{V_{1H2} \times DT_{H2}},$$

DT$_{H2}$ is the diffusion coefficient of the natural hydrogen, V$_{2H2}$ is the loss content of the natural hydrogen, and V$_{1H2}$ is the natural hydrogen content in the rock pores.

7. The method according to claim 4, wherein determining the diffusion evaluation parameter, based on the natural hydrogen content in the rock pores, the loss content of the natural hydrogen and the diffusion coefficient of the natural hydrogen, comprises:

inputting, into a pre-constructed diffusion evaluation model, the natural hydrogen content in the rock pores, the loss content of the natural hydrogen and the diffusion coefficient of the natural hydrogen, to obtain the diffusion evaluation parameter TC of the natural hydrogen in the rock pores of the rock to be evaluated; and wherein the pre-constructed diffusion evaluation model is represented as:

$$TC = \frac{V_{2H2}}{V_{1H2} \times DT_{H2}},$$

DT$_{H2}$ is the diffusion coefficient of the natural hydrogen, V$_{2H2}$ is the loss content of the natural hydrogen, and V$_{1H2}$ is the natural hydrogen content in the rock pores.

8. The method according to claim 1, wherein determining the diffusion evaluation parameter, based on the natural hydrogen content in the rock pores, the loss content of the natural hydrogen and the diffusion coefficient of the natural hydrogen, comprises:

inputting, into a pre-constructed diffusion evaluation model, the natural hydrogen content in the rock pores, the loss content of the natural hydrogen and the diffusion coefficient of the natural hydrogen, to obtain the diffusion evaluation parameter TC of the natural hydrogen in the rock pores of the rock to be evaluated; and wherein the pre-constructed diffusion evaluation model is represented as:

$$TC = \frac{V_{2H2}}{V_{1H2} \times DT_{H2}},$$

DT$_{H2}$ is the diffusion coefficient of the natural hydrogen, V$_{2H2}$ is the loss content of the natural hydrogen, and V$_{1H2}$ is the natural hydrogen content in the rock pores.

9. An electronic device comprising a non-transitory memory and a processor, wherein the non-transitory memory is configured to store a computer program, and the processor is configured to call and run the computer program stored in the memory, and execute the method according to claim 1.

10. A non-transitory computer-readable storage medium, the non-transitory computer-readable storage medium storing a computer program, wherein the computer program, when executed by a processor, cause the processor to perform the method according to claim 1.

11. An apparatus for evaluating a natural hydrogen diffusion in rock pores, comprising:

a non-transitory memory storing computer readable instructions; and one or more processors in communication with the one or more processors, wherein the instructions, when executed by the one or more processors, causes the apparatus to:

collect, at a target pressure and a target temperature, rock physics data of a rock to be evaluated using a scanning electron microscopy and a high-pressure mercury intrusion, determine, based on the collected rock physics data of the rock, a full aperture distribution and a pore throat diameter distribution of the rock to be evaluated using adsorption tests, and determine a mineral composition of the rock to be evaluated, to perform a simulation calculation of a natural hydrogen adsorption using a pre-constructed pore model of the rock to be evaluated, and determine, based on the simulation calculation, an average number of hydrogen molecules adsorbed in rock pores of the rock when natural hydrogen in the rock pores is saturated at the target pressure and the target temperature, wherein the pre-constructed pore model is a simulated pore model built using actual pore conditions of the rock to be evaluated, the actual pore conditions comprising the full aperture distribution, the pore throat diameter distribution and the mineral composition of the rock, and a specific surface area, a total pore volume and a pore diameter distribution of the pre-constructed pore model of the rock to be evaluated being approximately equal to results obtained through experimental measurements;

input, into a pre-constructed ideal model for a natural hydrogen content prediction, lithologic parameters of the rock to be evaluated, the average number of hydrogen molecules adsorbed in the rock pores when the natural hydrogen in the rock pores is saturated at the target pressure and the target temperature, and the target pressure and the target temperature, to obtain a natural hydrogen content $V_{1H2}$ in the rock pores, wherein the lithologic parameters comprise a pore diameter of the rock to be evaluated, pore type influence coefficients of the rock to be evaluated, and a pore specific surface area of the rock to be evaluated, wherein the pre-constructed ideal model is a linear relationship between the natural hydrogen content $V_{1H2}$ in the rock pores and influencing factors, and is configured to predict the natural hydrogen content $V_{1H2}$;

add one or more gases other than the natural hydrogen to the pre-constructed pore model, and when the pore model saturates at the target pressure and the target temperature, determine a loss content of the natural hydrogen in the rock pores, and determine a diffusion coefficient $DT_{H2}$ of the natural hydrogen based on a preset diffusion coefficient correction model, wherein the preset diffusion coefficient correction model is a relationship between the diffusion coefficient $DT_{H2}$ of the natural hydrogen and one or more diffusion coefficients of the one or more gases, and is configured to determine the diffusion coefficient $DT_{H2}$ of the natural hydrogen; and generate a diffusion evaluation parameter of the natural hydrogen in the rock pores based on the natural hydrogen content $V_{1H2}$ in the rock pores, and the loss content of the natural hydrogen and the diffusion coefficient $DT_{H2}$ of the natural hydrogen, the diffusion evaluation parameter quantitatively representing dynamic diffusion of the natural hydrogen in the rock under geological conditions, wherein the method provides a quantitative evaluation of the dynamic diffusion of the natural hydrogen in the rock pores of the rock by collecting specific rock physics data of the rock and by calculation and simulation using models and the collected specific rock physics data;

wherein the pre-constructed ideal model for natural hydrogen content prediction is represented as:

$$V_{1H2} = \sum_{i=1}^{n} K_i(aT + bP + cD + dS) \times V_m \times \frac{N}{N_A},$$

and the diffusion coefficient of the natural hydrogen is:

$$DT_{H2} = \sum_{i=1}^{n} K_i\left(hT + rP + kD + eR + x\sum_{j=1}^{m} DT_j\right),$$

$K_i$ is an ith pore type influence coefficient, n is a total number of the pore type influence coefficients, T is a formation temperature, P is a formation pressure, D is the pore diameter, S is the pore specific surface area, $V_m$ is a gas volume under a standard condition, N is the average number of hydrogen molecules, $N_A$ is an avogadro constant, a, b, c and d are fitting constants obtained based on training samples, respectively, R is a pore throat channel diameter of the rock to be evaluated, DTj is a diffusion coefficient of a jth gas of the one or more gases in the rock pores, m is a number of types of the one or more gases, and h, r, k, e and x are fitting constants obtained based on training samples, respectively.

* * * * *